US012309189B2

(12) United States Patent
Vetsch et al.

(10) Patent No.: US 12,309,189 B2
(45) Date of Patent: May 20, 2025

(54) COMPLIANCE RISK MANAGEMENT FOR DATA IN COMPUTING SYSTEMS

(71) Applicant: International Business Machines Corporation, Armonk, NY (US)

(72) Inventors: Pascal Vetsch, Zurich (CH); John G. Rooney, Zurich (CH); Luis Garcés Erice, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 17/453,495

(22) Filed: Nov. 4, 2021

(65) Prior Publication Data

US 2023/0140160 A1 May 4, 2023

(51) Int. Cl.
*H04L 29/00* (2006.01)
*G06F 16/28* (2019.01)
*H04L 9/40* (2022.01)

(52) U.S. Cl.
CPC ........ *H04L 63/1433* (2013.01); *G06F 16/285* (2019.01)

(58) Field of Classification Search
CPC ... H04L 63/1433; G06F 16/285; G06F 21/577
See application file for complete search history.

(56) References Cited

U.S. PATENT DOCUMENTS 10,432,605 B1 * 10/2019 Lester ................... G06F 21/552
10,484,429 B1    11/2019 Fawcett
10,811,139 B1 * 10/2020 Wang ..................... G06N 20/20
10,887,335 B2 *  1/2021 Pilkington .......... H04L 63/1425
10,929,936 B1 *  2/2021 Duranske .............. G06Q 50/26
11,010,260 B1 *  5/2021 Savir ................... G06F 11/3452

(Continued)

FOREIGN PATENT DOCUMENTS

| CN | 111095308 A | 5/2020 |
| CN | 113297429 A | 8/2021 |
| TW | 201426578 A | 7/2014 |

OTHER PUBLICATIONS

International Search Report and Written Opinion, International Application No. PCT/EP2022/079686, International Filing Date Oct. 25, 2022.

*Primary Examiner* — Don G Zhao
(74) *Attorney, Agent, or Firm* — Joseph P. Curcuru

(57) ABSTRACT

Embodiments of the present invention provide methods, computer program products, and systems. For each dataset in the system, embodiments of the present invention can identify at least one stack of hierarchically-dependent system components on which that dataset is dependent, and generate a system graph having nodes interconnected by directed edges. Dependency of each dataset on a stack, and between successive components in each stack, is represented by a directed edge between nodes of the graph. Embodiments of the present invention can then calculate for each dataset, a stack-dependent compliance score as a function of the compliance scores for a set of nodes reached by traversing directed edges in the graph from the node corresponding to that dataset, and generate an alert if the stack-dependent compliance score for a dataset breaches a predetermined risk threshold for that dataset.

20 Claims, 10 Drawing Sheets

(56) References Cited

U.S. PATENT DOCUMENTS

| | | | |
|---|---|---|---|
| 2004/0177139 A1* | 9/2004 | Schuba | H04L 67/61 |
| | | | 709/223 |
| 2012/0194502 A1* | 8/2012 | Smith | G06F 8/38 |
| | | | 345/418 |
| 2014/0278728 A1* | 9/2014 | Hollenbach | G06Q 10/0635 |
| | | | 705/7.28 |
| 2016/0379326 A1* | 12/2016 | Chan-Gove | H04L 63/107 |
| | | | 705/325 |
| 2017/0193239 A1 | 7/2017 | Chari | |
| 2017/0286690 A1 | 10/2017 | Chari | |
| 2018/0144138 A1 | 5/2018 | Zhang | |
| 2018/0367549 A1* | 12/2018 | Jang | G06N 5/022 |
| 2019/0156243 A1 | 5/2019 | Li | |
| 2020/0104725 A1* | 4/2020 | Travisano | G06N 5/01 |
| 2020/0151620 A1* | 5/2020 | Chao | G06N 3/084 |
| 2020/0356920 A1* | 11/2020 | Vittal | G06Q 10/0635 |
| 2020/0396241 A1* | 12/2020 | Crabtree | H04L 63/1433 |
| 2020/0410116 A1 | 12/2020 | Williamson | |
| 2021/0021644 A1* | 1/2021 | Crabtree | G06F 16/951 |
| 2021/0055933 A1 | 2/2021 | Bulut | |
| 2021/0232994 A1* | 7/2021 | Rhodes | G06Q 50/26 |
| 2021/0297452 A1* | 9/2021 | Crabtree | G06F 16/2477 |
| 2023/0171292 A1* | 6/2023 | Crabtree | H04L 63/1433 |
| | | | 726/22 |
| 2024/0126889 A1* | 4/2024 | Clark | G06F 21/577 |

* cited by examiner

COMPLIANCE RISK MANAGEMENT FOR DATA IN COMPUTING SYSTEMS

BACKGROUND

The present invention relates generally to compliance risk management for data in computing systems. Computer-implemented methods are provided for managing compliance risk for data in computing systems, together with apparatus and computer program products implementing such methods.

Typically, computing systems must comply with various internally and externally defined standards. For example, to comply with essential security and regulatory requirements, systems must implement security measures against unauthorized system access and satisfy legal requirements relating to protection and privacy of data in the system. Various compliance assessment applications can be deployed to assess performance of system components (e.g., applications, storage systems, virtual machines, hypervisors, etc.) in relation to the relevant requirements. The compliance assessment shows which components are at risk of breaching the standards applicable to the system.

Conventional compliance assessments focus on individual system components. For example, some compliance assessment services allow users to identify resources at risk in a cloud-based system, where the resource types here are system components and cloud services. This compliance service runs various checks, calculates a compliance score, and displays the result for the checked resource. Another example is the Openshift Compliance Operator application developed by Red Hat Incorporated. This application can check the compliance state of the OpenShift platform and the underlying infrastructure and calculate compliance scores for both.

To ensure that computing systems operate securely and properly protect their data assets, improved techniques are required for ensuring compliance, especially with regard to managing compliance risks for data in these systems.

SUMMARY

A first aspect of the present invention provides a computer-implemented method for managing compliance risk for data in a computing system. The method includes, for each dataset in the system, identifying at least one stack of hierarchically-dependent system components on which that dataset is dependent, and generating a system graph having nodes interconnected by directed edges. Each dataset, and each component in each stack, is represented by a corresponding node of the system graph. Dependency of each dataset on a stack, and between successive components in each stack, is represented by a directed edge between nodes of the graph. Compliance scores are stored for respective nodes corresponding to system components, where the compliance score for a node relates to the corresponding system component. The method further comprises calculating, for each dataset, a stack-dependent compliance score as a function of the compliance scores for a set of nodes reached by traversing directed edges in the graph from the node corresponding to that dataset, and generating an alert if the stack-dependent compliance score for a dataset breaches a predetermined risk threshold for that dataset.

Another aspect of the invention provides apparatus for managing compliance risk for data in a computing system. The apparatus includes system analyzer logic adapted, for each dataset in the system, to identify at least one stack of hierarchically-dependent system components on which that dataset is dependent, and graph generator logic adapted to generate a system graph as described above. The apparatus further comprises memory for storing the system graph and compliance scores for nodes as described above, along with compliance manager logic adapted to calculate a stack-dependent compliance score for each dataset and generate alerts as described above.

A further aspect of the invention provides a computer program product comprising a computer readable storage medium embodying program instructions, executable by a computing system, to cause the computing system to implement a method described above for managing compliance risk for data in a computing system.

Embodiments of the invention will be described in more detail below, by way of illustrative and non-limiting example, with reference to the accompanying drawings.

DETAILED DESCRIPTION

Figure 1:
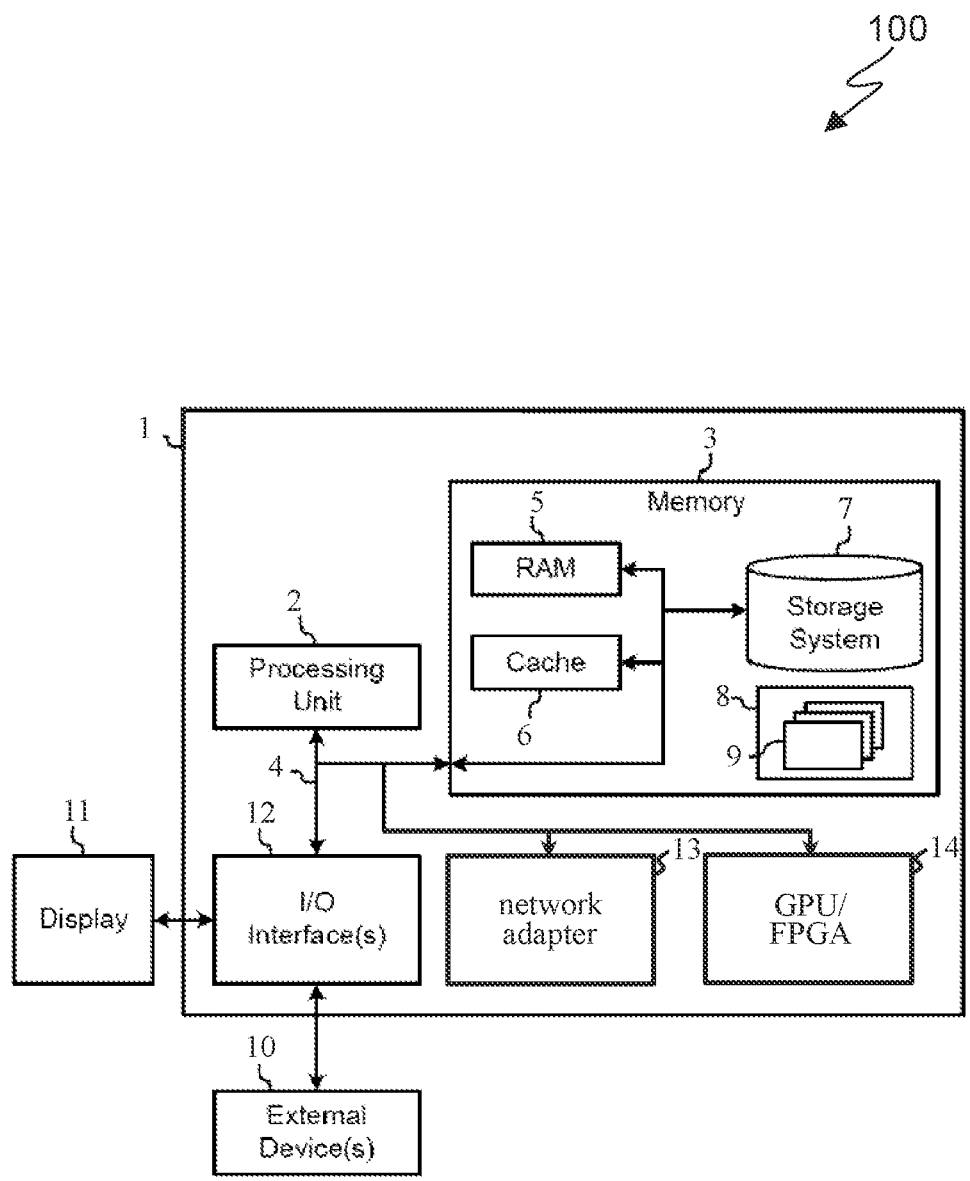
FIG. 1 is a schematic representation of computing apparatus for implementing methods, in accordance with an embodiment of the present invention.

Embodiments of the invention allow compliance risks to data in computing systems to be managed in a manner which accounts for the various interdependencies between datasets and individual components of a system. The components of a typical computing system do not operate independently. Each component is generally reliant on one or more other components with which that component interacts in some way. Applications are dependent on underlying platforms and infrastructure, virtual machines are dependent on hypervisors, hypervisors and operating systems and are dependent on underlying hardware resources, and so on. A dataset which is processed by a particular application, or stored on a particular storage system, is therefore dependent on a stack of hierarchically dependent system components, each of which depends on another in order of the hierarchy down through the stack. Any given dataset can depend on one or more such stacks, and overall interdependency of datasets and components can be complex in many computing environments.

By focusing on compliance of individual components, prior compliance assessment techniques neglect the important effect of these dependencies. A non-compliant component will have no effect on compliance of surrounding components, e.g., if a storage system is non-compliant, this will have no compliance impact on a database service which stores data on the storage system. In reality, there can be a substantial impact due to system dependencies. Methods embodying the invention accommodate this impact by generating a specialized data structure in the form of a graph representing dependencies in a system, and then use this graph to calculate a stack-dependent compliance score for each dataset in the system. An alert is generated if the resulting score indicates a compliance risk, allowing action to be taken to mitigate this risk. By accommodating dependency between data and components and between stacked components in a system, the stack-dependent compliance scores quantify the true risk to data assets. These scores provide a complete assertion about the compliance posture of the whole system, enabling action to be taken as necessary to ensure data that is protected. Methods embodying the invention thus significantly improve compliance management of computing systems, offering improved systems with better protection of data assets.

An alert generated for a dataset may be output to an operator for appropriate action to be taken. In addition, or as an alternative, preferred methods include, in response to an alert for a dataset, initiating an action in the system to mitigate the compliance risk for that dataset. Such an action may comprise one or more operations such as: restricting access permissions in the system for the dataset; deleting the dataset; isolating a system component storing the dataset; and reconfiguring a stack of system components on which the dataset is dependent. Selection of appropriate actions may be based on predefined rules which can accommodate various parameters, such as data classification (confidential, public, personal, etc.), degree of risk, and source of non-compliance based on the contributing compliance scores for components. This allows essential action to be taken as necessary, without waiting for operator intervention, to protect system data.

The stack-dependent compliance score for a dataset may be calculated as a function of the compliance scores for the aforementioned set of nodes and a predefined maximum compliance score for the dataset. When calculating the stack-dependent score for a dataset, preferred embodiments identify the aforementioned set of nodes by traversing directed edges from the node corresponding to that dataset up to a predetermined maximum depth in the graph. This both simplifies processing and overcomes the problem that dependency paths can be circular in system graphs for complex environments. Advantageously, however, preferred embodiments can designate certain dependencies as critical for determining compliance risk. In particular, for any edge in the system graph representing one of a predefined set of dependency types, that edge can be identified as a "priority edge" which must be traversed in identifying the set of nodes for computation of the stack-dependent score for a dataset. In these embodiments, the set of nodes is determined by traversing directed edges from the node corresponding to the dataset up to a predetermined maximum depth in the graph, subject to always traversing any priority edge between nodes corresponding to components in the stack(s) for the dataset. This ensures that edges representing critical dependencies, which can severely affect data compliance, are always traversed.

Particularly preferred embodiments can further accommodate different types of dependency between components by defining a weight for each edge of the graph in dependence on a type of dependency represented by that edge. These methods calculate an impact score for each node in the aforementioned set as a function of the compliance score for that node and the weight of the directed edge traversed to reach that node. The stack-dependent compliance score for the dataset is then calculated as a function of the impact scores for nodes in the set. This allows the contributions of nodes to stack-dependent scores to be tuned according to different degrees of dependency in the system.

Advantageously, generation of the system graph can be based on standard metadata which is automatically acquired from the computing system. In particular, embodiments may access at least one system inventory provided in the computing system to obtain system metadata indicating configuration of system components, and access at least one data catalog provided in the computing system to obtain data metadata indicating location and usage of each dataset in the system. These methods can then identify the stack(s) of system components for each dataset from the system metadata and data metadata. Similarly, preferred methods include communicating with at least one compliance application provided in the computing system to obtain the compliance scores for nodes of the graph. Moreover, preferred methods can dynamically update the system graph in response to detection of events in the system. Events here may comprise: addition of a dataset; deletion of a dataset; a change to a stack of system components for a dataset; and a change in the compliance score for a node of the graph. These methods can then calculate a new stack-dependent compliance score for (at least) each dataset affected by an event. This provides an adaptive process which can accommodate changes during system operation, reevaluating compliance scores to ensure that all data is protected appropriately.

Some embodiments may also calculate stack-dependent compliance scores for nodes representing system components. This and other features and advantages of methods embodying the invention are described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for managing compliance risk for data in a computing system. Such methods may be implemented by computing apparatus comprising one or more general- or special-purpose computers, each of which may comprise one or more (real or virtual) machines, providing functionality for implementing operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram 100 of exemplary computing apparatus for implementing methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as a GPU (graphics processing unit) or FPGA, for implementing embodiments of the invention. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
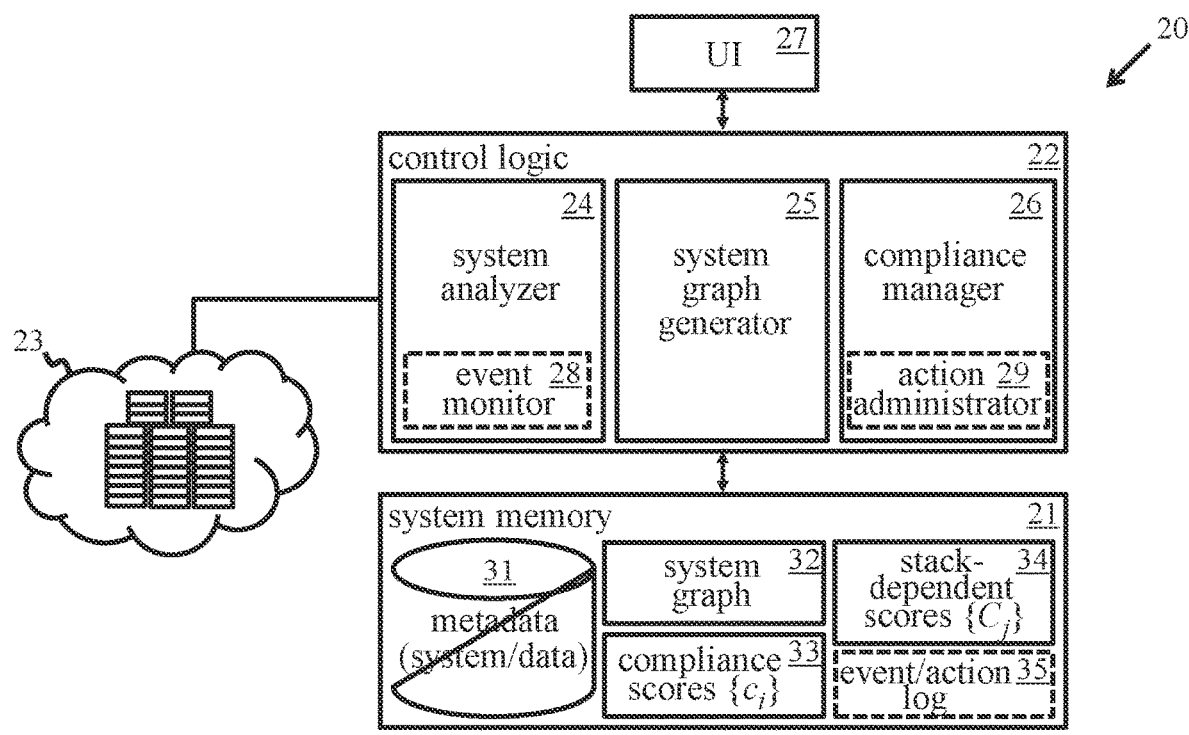
FIG. 2 illustrates component modules of an exemplary computing apparatus for managing data compliance risk in a computing system, in accordance with an embodiment of the present invention.

The FIG. 2 schematic illustrates component modules of an exemplary computing apparatus for managing data compliance risks in a computing system. The apparatus 20 comprises memory 21 and control logic, indicated generally at 22, comprising functionality for managing compliance risk for data in a computing system, here a datacenter 23. The control logic 22 comprises a system analyzer 24, a system graph generator 25, and a compliance manager 26. Each of these logic modules comprises functionality for implementing particular steps of a compliance management process detailed below. During this process, logic modules may communicate with a system operator via a user interface (UI) 27, displayed at a user computer, for user interactions with the system. In preferred embodiments below, the system analyzer 24 includes an event monitor module 28, and compliance manager 26 includes an action administrator module 29, as indicated by dashed lines in the figure.

Logic modules 24 through 26 interface with memory 21 which stores various data structures used in operation of apparatus 20. These data structures include a set of metadata 31 for the system 23 to be managed, a system graph 32 produced by graph generator 25 in operation, a set of compliance scores 33, denoted by $\{c_i\}$, i=1, 2, 3, . . . , which are associated with respective nodes $n_i$ of the system graph 32, and a set of stack-dependent compliance scores 34, denoted by $\{C_j\}$, j=1, 2, 3, . . . , which are generated by compliance manager 26 for respective datasets $d_j$ in system 23. Memory 21 may also store a log 35 recording system events and administrative actions implemented by the apparatus in preferred embodiments below.

Apparatus 20 may be local or remote from the computing system 23 to be managed, and may be integrated in the system in some embodiments. In general, functionality of logic modules 24 through 26 may be implemented by software (e.g., program modules) or hardware or a combination thereof. Functionality described may be allocated differently between system modules in other embodiments, and functionality of one or more modules may be combined. The various components of apparatus 20 may be provided in one or more computers of a computing system. For example, all modules may be provided in a computer 1 at which UI 27 is displayed to an operator, or modules may be provided in one or more computers/servers to which user computers can connect via a network for interaction with the apparatus via a UI 27. Such a network may in general comprise one or more component networks and/or internetworks, including the Internet. System memory 21 may be implemented by one or more memory/storage components associated with one or more computers implementing apparatus 20.

The compliance management process in apparatus 20 uses the metadata 31 which is prestored in memory 21 for the system 23 to be managed. This metadata comprises both system metadata and data metadata. The system metadata identifies the various system components and indicates how the components are configured in the system. For example, a typical datacenter comprises a network of multiple computers/servers which may be clustered within the datacenter network, along with storage systems (solid-state drives, optical storage devices, tape storage systems etc.) and network devices (routers, switches, network controllers, etc). Any given server may support one or more operating systems/platforms, with hypervisors running one or more virtual machines, which in turn run one or more applications/services (possibly within one or more containers) in the system. Depending on the type and configuration of the system managed, system components may therefore comprise applications, services, operating systems, platforms, virtual machines, hypervisors, containers, storage systems, physical machines, network devices, networks, network clusters, datacenters, clusters of datacenters, and so on. The data metadata indicates where each dataset is stored and processed in the system. Various other metadata may be associated with system datasets. For example, data is typically classified according to degree of sensitivity, e.g. public, personal, confidential, etc., with more sensitive data having a higher classification, and this data classification will be included in the metadata for a dataset. In some embodiments, the metadata 31 may be defined by operator input via UI 27, e.g. for simple systems with relatively few resources. In preferred embodiments, however, the metadata 31 can be obtained automatically by scanning system 23 as explained below.

Figure 3:
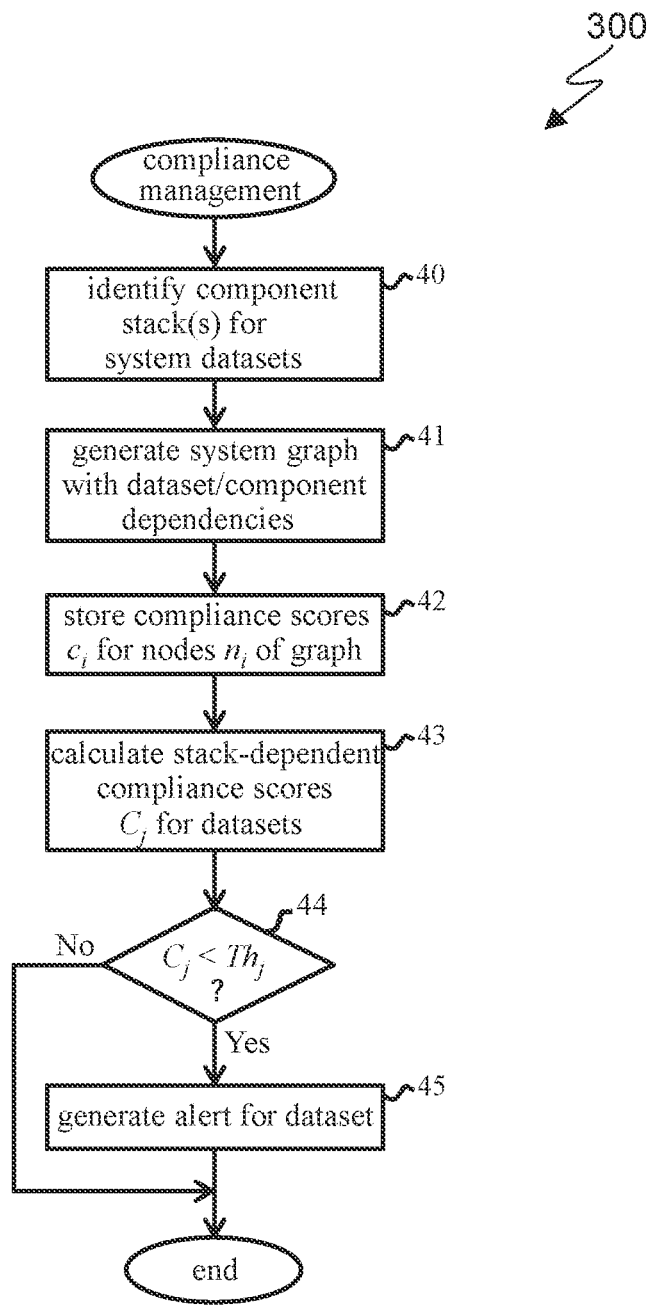
FIG. 3 indicates steps of a compliance management process performed by the FIG. 2 apparatus, in accordance with an embodiment of the present invention.
Figure 4:
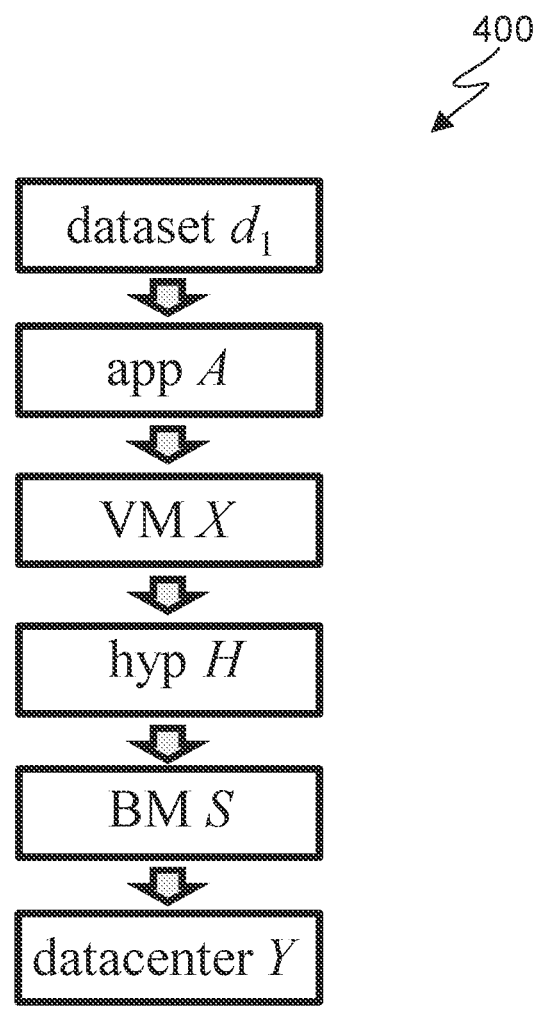
FIG. 4 is a schematic illustrating dependencies between components of a computing system, in accordance with an embodiment of the present invention.

FIG. 3 depicts a flowchart 300 which indicates basic steps of the compliance management process in apparatus 20. In step 40, the system analyzer 24 processes the metadata 31 to identify, for each dataset $d_j$ in system 23, one or more stacks of hierarchically-dependent system components on which that dataset is dependent. FIG. 4 shows one example (e.g., example stack 400) of such a stack. Here, a dataset $d_1$ is processed by an application (app) A which runs on a virtual machine (VM) X The VM runs on a hypervisor (hyp) H which in turn runs on a bare-metal server (BM) S located in a datacenter Y. The dataset $d_1$ is thus dependent on the stack of components from app A down to datacenter Y, where each component depends on the next in hierarchy order down through the stack. In a typical computing system 23, any given dataset may depend on one or more such stacks of components, e.g., where the dataset is processed by multiple applications. The system analyzer 24 passes data defining the components stacks for each dataset $d_j$ to system graph generator 25.

In step 41, the graph generator 25 generates a system graph, having nodes (vertices) interconnected by directed edges, representing components and dependencies in system 23. Each dataset $d_j$, and each component in each stack for that dataset, is represented by a corresponding node of the graph. Edges represent the dependencies in the system. Hence, dependency of each dataset on a stack, and between successive components in each stack, is represented by a directed edge between the relevant nodes of the graph. Data defining the resulting system graph is stored at 32 in system memory 21.

Step 42 of FIG. 3 represents storage in system memory 21 of the compliance scores 33 for system components which are assigned to the corresponding nodes $n_i$ of system graph 32. The compliance score $c_i$ for a node $n_i$ is an individual compliance score relating to the corresponding system component as determined by conventional compliance applications/services for system 23. These compliance scores may be input by an operator in some embodiments, or may be obtained automatically from the system as described below. The compliance scores $c_i$ for nodes can be stored as associated properties, or labels, for respective nodes $n_i$ in system graph 32.

Figure 5:
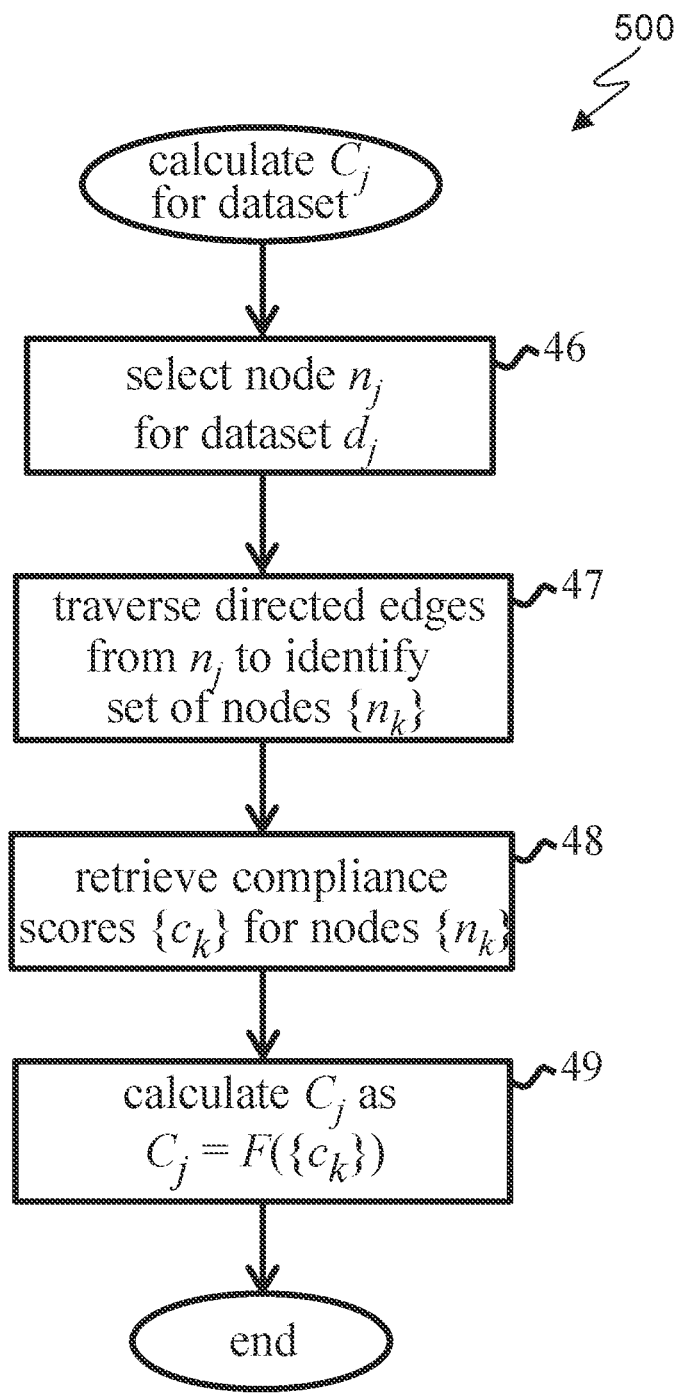
FIG. 5 shows steps involved in calculating stack-dependent compliance scores in FIG. 3, in accordance with an embodiment of the present invention.

In step 43, when the system graph has been fully populated, the compliance manager 26 processes the graph to calculate a stack-dependent compliance score for each dataset $d_j$ in the system. This process is shown in more detail in FIG. 5 (e.g., flowchart 500). In step 46 here, the compliance manager selects the node $n_j$ in system graph 32 corresponding to a dataset $d_j$. In step 47, the compliance manager traverses directed edges in the graph from the node $n_j$ to identify a set of nodes, denoted by $\{n_k\}$, reachable by traversing edges from $n_j$ in the graph. This search may identify all nodes reachable from dataset node $n_j$ or may be subject to various constraints described below. In step 48, the compliance manager retrieves the compliance scores $\{c_k\}$ for the resulting node set $\{n_k\}$. In step 49, the stack-dependent compliance score $C_j$ is calculated as a function, denoted here by F, of the compliance scores $\{c_k\}$. For example, in simple embodiments the function F comprises a monotonically increasing function of the compliance score for each node in $\{n_k\}$, whereby a higher individual score for a node results in a higher stack-dependent score. If a compliance score is not available for a node $n_k$ then this score is simply omitted from the calculation.

Returning to FIG. 3, in decision step 44 the compliance manager checks if the stack-dependent score $C_j$ breaches a predetermined risk threshold $Th_j$ for that dataset, signifying that data is at risk. The risk threshold $Th_j$ may be predefined by operator input or may be calculated automatically as explained below. Assuming here that higher compliance scores indicate better compliance, step 44 checks whether $C_j$ is below the threshold $Th_j$ for the dataset. If so, the risk threshold is breached and, in step 45, the compliance manager generates an alert for the dataset. This alert may be output to an operator via UI 27 for appropriate action to be taken and/or may prompt further action by compliance manager 26 as described below.

Figure 6:
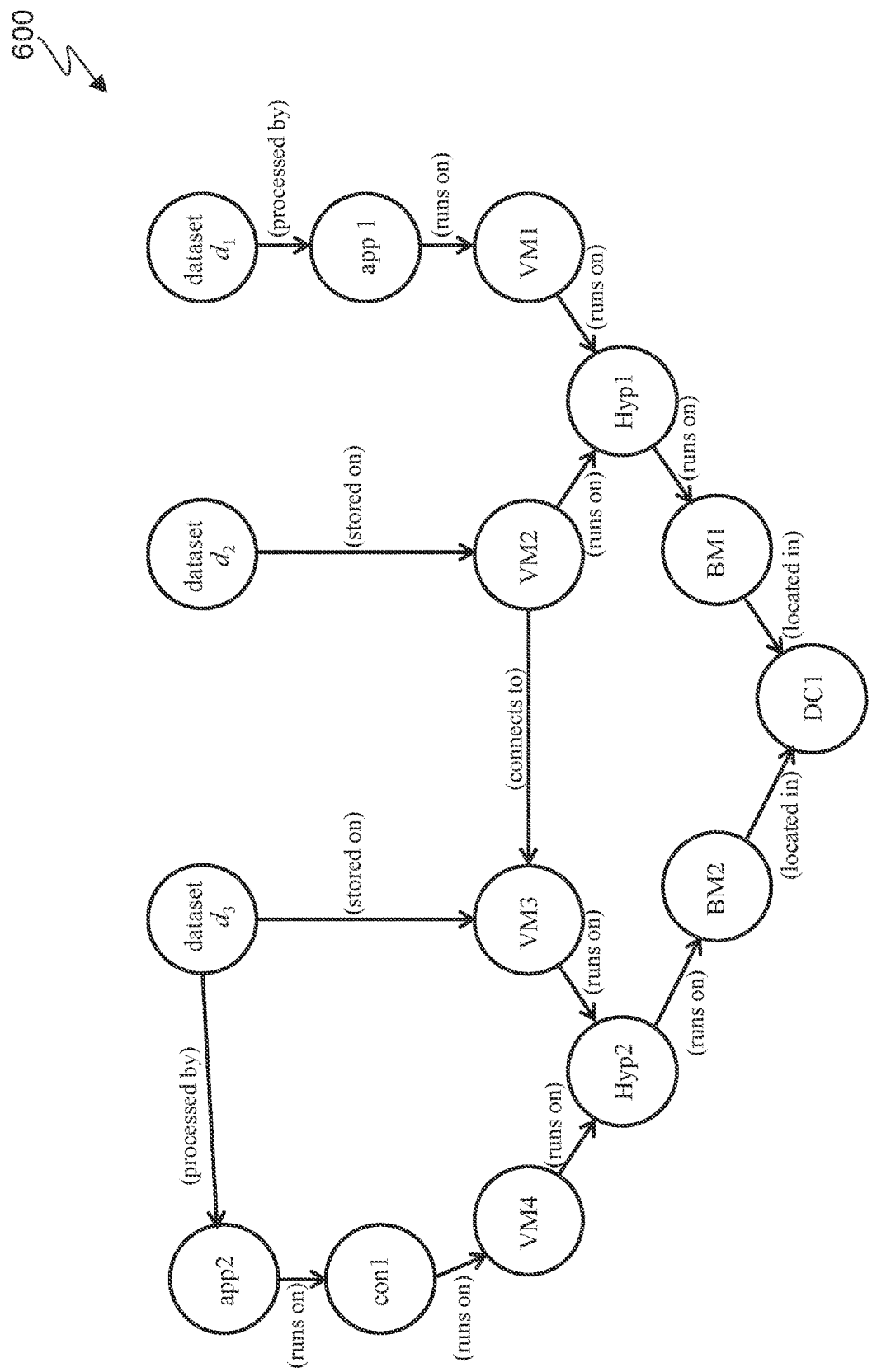
FIG. 6 is a schematic illustration of a system graph generated by the FIG. 2 apparatus, in accordance with an embodiment of the present invention.

FIG. 6 illustrates a portion of a system graph (e.g., graph 600) showing dependencies for three datasets in a computing system 23. Dependency types are indicated in brackets for the various edges. Here, dataset $d_1$ depends on one component stack which corresponds to that shown in FIG. 4. Dataset $d_2$ depends on two stacks via virtual machine VM2 which runs on hypervisor Hyp1 and also connects to virtual machine VM3. Dataset $d_3$ also depends on two stacks, one via VM3 which runs on hypervisor Hyp2, and another via application app2 which runs in application container con1 running on VM4 and Hyp2. In step 47 of FIG. 5, if the node set $\{n_k\}$ contains all nodes reachable from the dataset node $d_j$, the compliance scores of all nodes in all stacks for $d_j$ will be accommodated in the stack-dependent score, giving a "full-stack" compliance score $C_j$ for each dataset.

It will be seen that the above process accommodates the fact that relations between nodes of the system graph are transitive. For example, if a virtual machine runs on a non-compliant hypervisor, compliance of applications running on that virtual machine will also be compromised. By representing the complete computing system 23 with its compliance information, dependencies, and data assets in a directed graph, the compliance management process addresses the hidden compliance impact between dependent components and datasets to quantify the true risk to data, whereby action can be taken to ensure that data is properly protected.

Operation of a preferred embodiment of apparatus 20 will now be described in more detail. In this embodiment, the system analyzer 24 is adapted to scan computing system 23 to obtain the metadata required for the compliance management process. The entire system 23 may be scanned here, or a scope for this scan may be defined by operator input via UI 27, e.g., for system resources used by a particular user (e.g., a particular company) in a system 23 supporting multiple user accounts.

Figure 7:
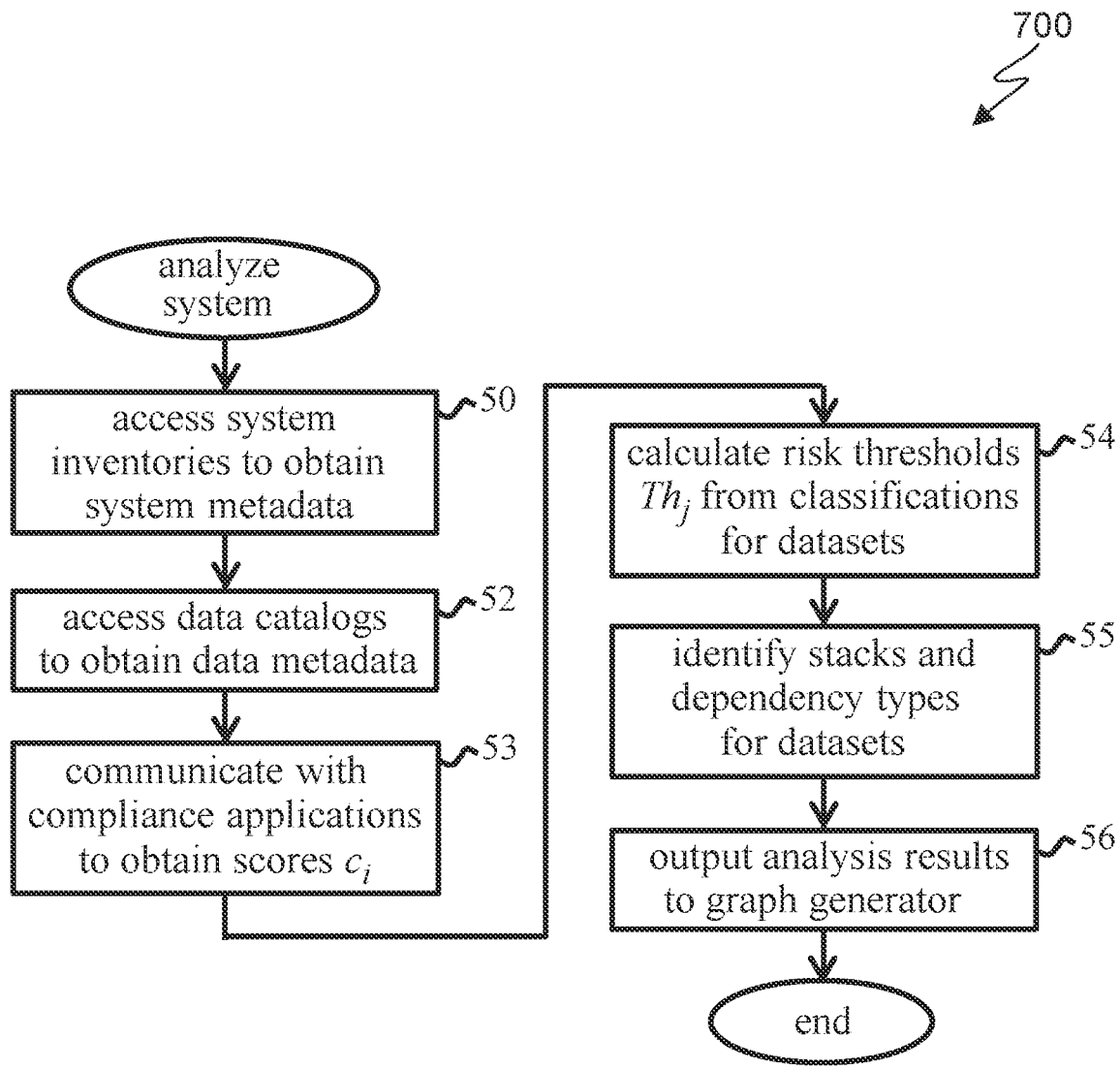
FIG. 7 indicates steps performed by a system analyzer in a preferred embodiment of the apparatus, in accordance with an embodiment of the present invention.

FIG. 7 shows flowchart 700 which depicts steps performed by the system analyzer here. In step 50, the system analyzer accesses one or more system inventories maintained in system 23 to obtain system metadata, indicating configuration of system components, within the defined scope of the scan. Similarly, in step 52, the system analyzer accesses one or more data catalogs provided in system 23 to obtain data metadata, indicating storage location and usage of each dataset, i.e., what processes the data. In step 53, the system analyzer communicates with one or more compliance monitoring applications in system 23 to obtain the local compliance scores for system components, within the scope of the scan, which will be represented by nodes in the system graph. All relevant data for populating the system graph is thus obtained automatically by placing calls to the appropriate APIs (Application Programming Interfaces) in system 23.

Where the metadata obtained in step 52 for a dataset includes a data security/sensitivity classification, in step 54 the system analyzer calculates a risk threshold $Th_j$ for the dataset as a function of the specified data classification, such that a higher risk threshold is defined for more sensitive data. In step 55, the system analyzer identifies the component stacks and dependencies for datasets generally as described above. Here, however, the system analyzer identifies the particular type of dependency between a pair of components. For example, dependency types may be those indicated in brackets in the system graph of FIG. 6. The analysis results, i.e., the identified datasets and components, with their associated dependencies, dependency types, compliance scores and risk thresholds, are output to graph generator 25 in step 56. System analysis is then complete for the current scan.

Figure 8:
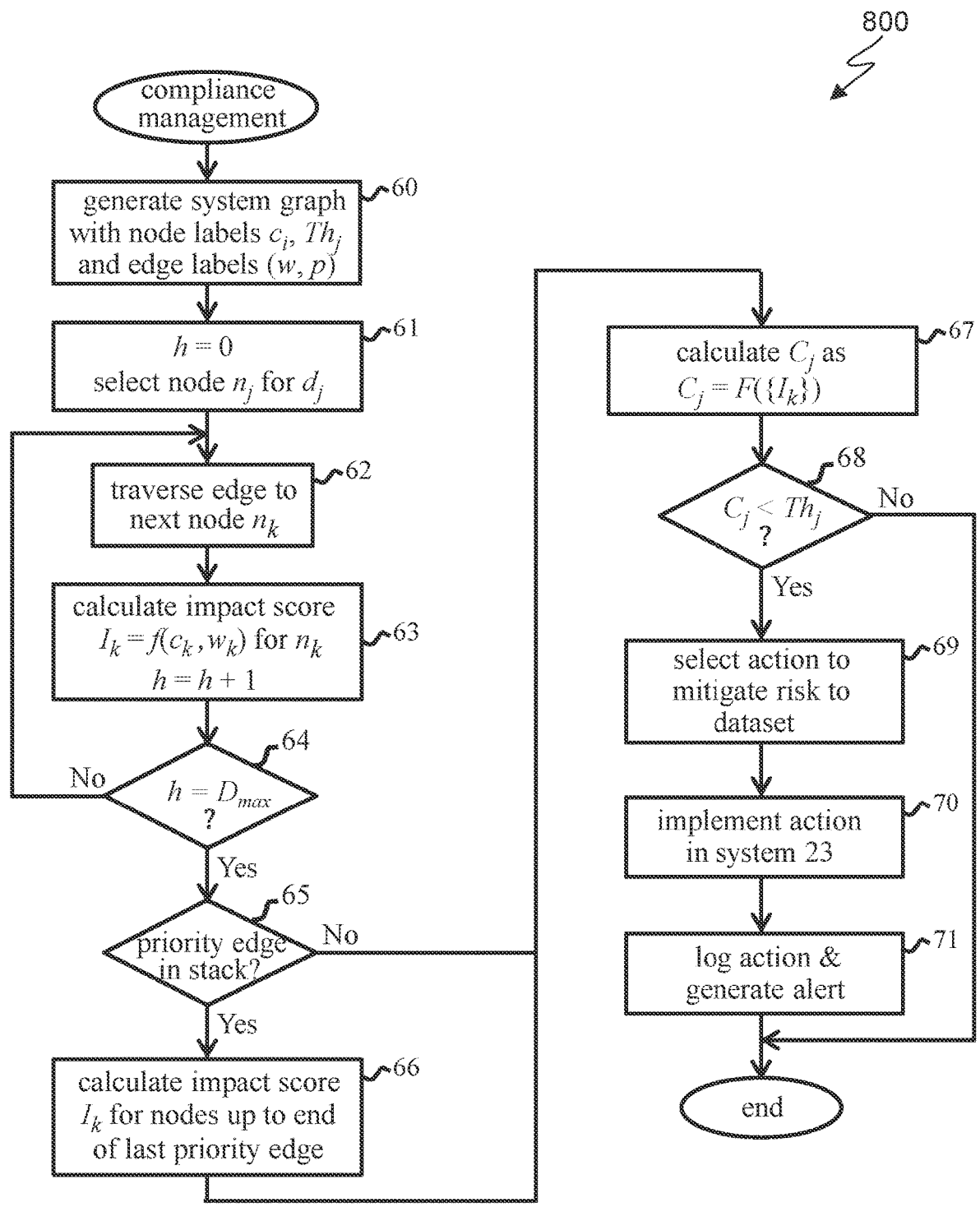
FIG. 8 indicates further steps, in accordance with an embodiment of the present invention

The ensuing compliance management process (e.g., flowchart 800) is shown in FIG. 8. In step 60, graph generator 25 generates the system graph generally as described above. Component nodes are labeled with their local compliance scores $c_i$, and dataset nodes are labeled with their risk thresholds $Th_j$. In this embodiment, the graph generator also labels each edge with a weight w dependent on the type of dependency represented by that edge. The weights w reflect the relative importance of the various dependencies in terms of their potential impact on data compliance. For example, a VM running on a hypervisor is more tightly coupled than a VM connecting to another VM. Therefore, each type of edge is assigned a weight w between 0 (no compliance impact) and 1 (maximum compliance impact). By way of example, weights maybe assigned to the dependencies of FIG. 6 as follows:

| Dependency type | Weight |
| --- | --- |
| runs on | 1 |
| stored on | 0.7 |
| processed by | 0.5 |
| connects to | 0.2 |
| located in | 0.2 |

In addition, graph generator 25 labels certain edges as "priority edges" by setting a priority label p to p=1. In particular, any edge representing one of a predefined set of dependency types is identified as a priority edge. This set of dependency types comprises critical dependencies which can severely affect data compliance. For example, an application which processes data can be heavily impacted by non-compliance of a VM running the application. The VM can in turn can be severely compromised by the underlying hypervisor. In the above list, therefore, any "runs on" edge is labeled as a priority edge. In this example, all other edge-types are labeled p=0. However, other edge-types may be included in the priority set as deemed appropriate for a given system.

After generation of the system graph, steps 61 to 71 of FIG. 8 are performed by compliance manager 26 for each dataset $d_j$ in the system to be managed. In step 61, the corresponding dataset node $n_j$ is located in the graph and a loop counter h is initialized to 0. Steps 62 to 66 are then performed for each directed edge leading from dataset node $n_j$. In step 62, the edge is traversed to the next node $n_k$, and an impact score $I_k$ is calculated for the node $n_k$ in step 63. The impact score $I_k$ is calculated as a function $f$ of the compliance score for $n_k$ and the weight (denoted by $w_k$ in the figure) of the directed edge traversed to reach that node. In this example, local compliance scores $c_i$ are defined as a percentage, and $I_k$ is calculated as $I_k = w_k(1 - c_k/100)$, where $c_k$ is the compliance score for node $n_k$. The loop counter h is then incremented and operation proceeds to step 64. This checks if h has reached a maximum hop-count $D_{max}$ defining a maximum depth in the graph for the search. If not, operation reverts to step 62 for the next hop.

When $h = D_{max}$ at step 64, operation proceeds to decision 65. Here the compliance manager checks for any priority edges (p=1) in a path reachable from the current node $n_k$, corresponding to priority dependencies lower in the stack. For any path with a priority edge here, the compliance manager calculates impact scores $I_k$ for all nodes $n_k$ in the path up to the end of the last priority edge. Operation then proceeds to step 67. If no paths with priority edges are detected at step 65, operation moves directly to step 67.

The stack-dependent score $C_j$ for the current dataset $d_i$ is calculated in step 67 as a function of the impact scores computed for nodes in steps 63 and 66. The overall score $C_j$ for a dataset is thus dependent on the impact scores for a set of nodes reached by traversing directed edges from dataset node $n_j$ up to the maximum depth $D_{max}$, subject to always traversing any priority edge between nodes corresponding to a pair of components in the component stack(s) for the dataset. In this example, the score $C_j$ is calculated as: $C_j = c_{max}(\Pi_k(1 - I_k))$, where $c_{max}$ is a predefined maximum compliance score for a dataset, e.g., $c_{max} = 100$.

In step 68, the compliance manager checks if the stack-dependent score $C_j$ for the current dataset $d_j$ breaches the risk threshold $Th_j$ for dataset node $n_j$. If not, operation is complete for that dataset. However, if a risk is identified at step 68, the compliance manager initiates appropriate action to mitigate the risk. In step 69 here, the action administrator module 29 selects an appropriate action to protect the data. The action selected may involve one or more predefined actions such as: restricting access permissions in the system for the dataset; deleting the dataset; isolating a system component storing the dataset; and reconfiguring a stack of system components for the dataset. Action selection can be based on predefined rules in action administrator 29, where rules can accommodate various parameters such as data classification, degree of risk, and source of non-compliance based on the contributing compliance scores for components. For example, if a hypervisor is identified as a primary source of non-compliance, the VMs running on this hypervisor may be migrated to a different, more compliant hypervisor. Data may be isolated by shutting down a machine storing a dataset, or access permissions may be revoked for all but highest-clearance users. A highly classified dataset may be deleted if risk is deemed critical. In general, any administrative action may be implemented, subject to necessary access permissions in the system, to mitigate the risk and protect data appropriately. The selected action is implemented by action administrator 29 in step 70 of FIG. 8. In step 71, the action is recorded in action log 35, and an alert is output to an operator for review.

Figure 9:
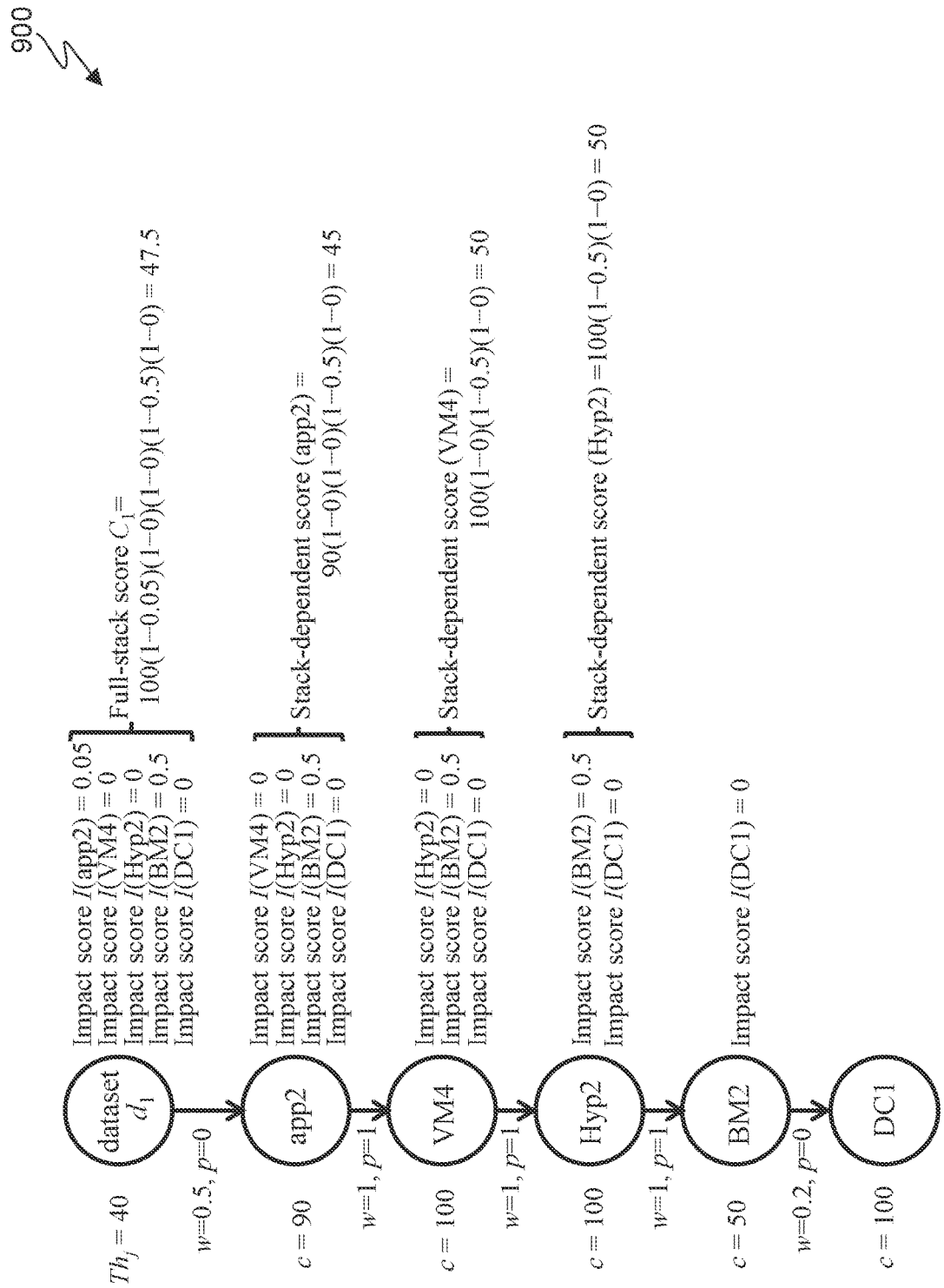
FIG. 9 illustrates calculation of stack-dependent compliance scores in an implementation of the FIG. 8 process, in accordance with an embodiment of the present invention.

FIG. 9 shows an example of the compliance score calculation for dataset $d_1$ (e.g., example 900) in the FIG. 6 graph. This calculation assumes local compliance scores c and edge labels as shown in the figure, and a maximum depth $D_{max} = 5$. This accommodates the entire stack of dependencies for $d_1$, resulting in a full-stack compliance score of $C_1=47.5$. As illustrated in this figure, the compliance manager may also calculate stack-dependent compliance scores for each of a subset of nodes corresponding to system components in the stack. Here, stack-dependent compliance scores C are calculated for component nodes as $C=c(\Pi_k(1-I_k))$, where c is the local compliance score for the node in question. Individual risk thresholds may be defined for the component nodes, and an alert can be generated and/or appropriate action taken if any stack-dependent score breaches a risk threshold. Alternatively, stack-dependent scores may be calculated for predetermined node types which are most likely to impact data compliance. This further mitigates risk to data by allowing correction of compliance risks lower in the stack where necessary.

Figure 10:
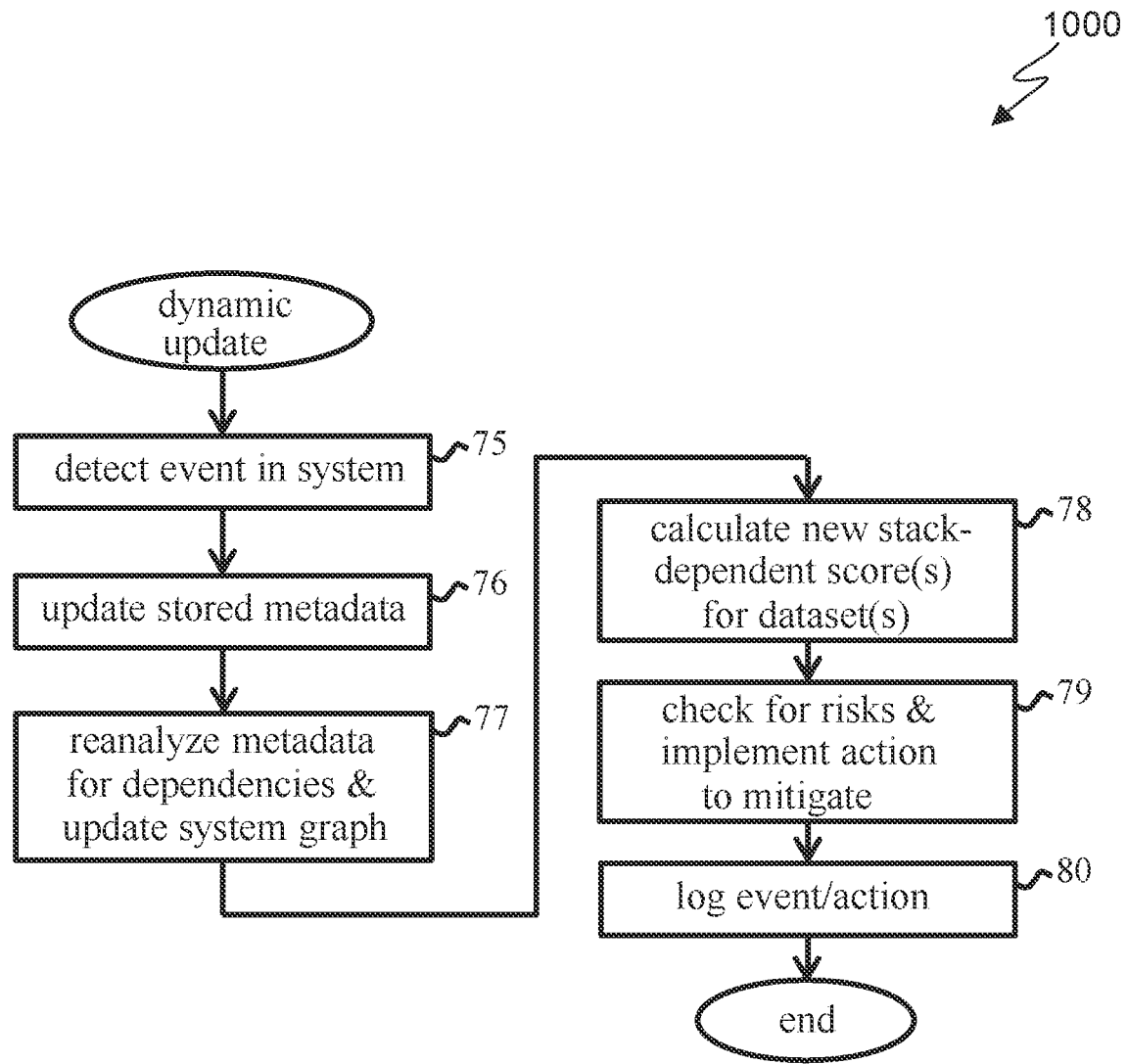
FIG. 10 indicates steps of a dynamic update process, in accordance with an embodiment of the present invention.

The management process of FIGS. 7 and 8 may be performed periodically during system operation, or as required for a given system user in a multi-user environment. In preferred embodiments, however, the event monitor 28 of system analyzer 24 is responsive to events in system 23 to trigger dynamic update of the system graph. This may be implemented by an event-driven metadata steaming system, whereby any updates to metadata in system 23 are streamed to event monitor 28. FIG. 10 depicts flowchart 1000 that show illustrative steps for calculating new stack dependent scores and logging one or more events and/or actions. In step 75, the event monitor 28 detects a relevant event in the system by analyzing metadata updates received from the system. Events detected here may be: the addition of a dataset; deletion of a dataset; a change to a stack of system components for a dataset; and a change in the compliance score for a node of the graph. Another event may be a change to a data classification where this is used to determine the risk threshold for a dataset. Metadata 31 stored in system memory 21 is updated accordingly in step 76. In step 77, the system analyzer 24 reanalyzes the updated metadata, and the graph generator updates the system graph based on the analysis results. New stack-dependent scores are then calculated in step 78, at least for any dataset affected by a change in the system graph. In step 79, the compliance manager checks for compliance risks and initiates any necessary action as described above. The event/action is then recorded in log 35 in step 80. This dynamic update process further mitigates risk to data by ensuring that the system graph is always up-to-date.

It will be seen that the above embodiment incorporates the various dependencies between infrastructure components and data into a single system graph, accommodating local compliance states and data classifications, to quantify the true risk of data exposure and act to protect data as necessary. By accounting for system dependencies in this way, the management system addresses the real impact of compliance issues on data in complex environments. The techniques described are readily scalable to any type of computing system, whether a small localized system or a highly complex, enterprise-scale computing environment.

Various alternatives and modifications to the embodiments described can of course be envisaged. By way of example, system graphs may include nodes for components other than those shown in the figures as appropriate for a particular computing system. Other edge types may be defined as deemed appropriate for a particular system graph. The techniques described can be applied to one or more datasets in a computing system. Various other functions can also be envisaged for calculating the impact scores and stack-dependent compliance scores.

In general, where features are described herein with reference to a method embodying the invention, corresponding features may be provided in an apparatus/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
for each dataset in a computing system, identifying at least one stack of hierarchically-dependent system components on which a dataset is dependent;
communicating with one or more compliance monitoring applications to obtain local compliance scores for the hierarchically-dependent system components, within the scope of a scan, wherein data for populating a system graph is obtained by placing calls to an Application Programming Interfaces (API) and represented by a node;
generating the system graph having nodes interconnected by directed edges based on the calls to the API, wherein each dataset, and each component in the at least one stack, is represented by a corresponding node of the graph and dependency of each dataset on the at least one stack, and between successive components in each stack of the at least one stack, is represented by a directed edge between nodes of the graph;
storing the compliance scores for respective nodes corresponding to system components, the compliance score for a node relating to the corresponding system component;
for each dataset, calculating a stack-dependent compliance score as a function of the compliance scores for a set of nodes reached by traversing directed edges in the graph from the node corresponding to the dataset; and
generating an alert if the stack-dependent compliance score for a dataset breaches a predetermined risk threshold for the dataset.

2. The computer-implemented method of claim 1, wherein the stack-dependent compliance score for a dataset is calculated as the function of the compliance scores for the set of nodes and a predefined maximum compliance score for the dataset.

3. The computer-implemented method of claim 1, further comprising:
in response to an alert for a dataset, initiating an action in the system to mitigate the compliance risk.

4. The computer-implemented method of claim 3, wherein the action comprises at least one of: restricting access permissions in the system for the dataset; deleting the dataset; isolating the system component storing the dataset; and reconfiguring the at least one stack of system components for the dataset.

5. The computer-implemented method of claim 1, further comprising:
in calculating the stack-dependent compliance score for each dataset, identifying the set of nodes by traversing directed edges from the node corresponding to the dataset up to a predetermined maximum depth in the graph.

6. The computer-implemented method of claim 1, further comprising:
for any edge in the system graph representing one of a predefined set of dependency types, identifying the edge as a priority edge; and
in calculating the stack-dependent compliance score for each dataset, identifying the set of nodes by traversing directed edges from the node corresponding to the dataset up to a predetermined maximum depth in the graph, subject to always traversing any priority edge between nodes corresponding to components in the at least one stack for the dataset.

7. The computer-implemented method of claim 1, wherein the stack-dependent compliance score for each dataset comprises a monotonically increasing function of the compliance score for each node in the set of nodes for the dataset.

8. The computer-implemented method of claim 1, further comprising:
defining a weight for each edge of the graph in dependence on a type of dependency represented by the edge;
in calculating the stack-dependent compliance score for each dataset, calculating an impact score for each node in the set as a function of the compliance score for the node and the weight of the directed edge traversed to reach the node; and
calculating the stack-dependent compliance score for the dataset as a function of the impact scores for nodes in the set.

9. The computer-implemented method of claim 1, further comprising:
accessing at least one system inventory provided in the computing system to obtain system metadata indicating configuration of the system components;
accessing at least one a data catalog provided in the computing system to obtain data metadata indicating location and usage of each dataset in the system; and
identifying the at least one stack of the system components for each dataset from the system metadata and data metadata.

10. The computer-implemented method of claim 9, further comprising:
including determining the risk threshold for each dataset in dependence on a data classification included in the data metadata.

11. The computer-implemented method of claim 1, further comprising:
communicating with at least one compliance monitoring application provided in the computing system to obtain the compliance scores for nodes of the graph.

12. The computer-implemented method of claim 1, further comprising:
dynamically updating the system graph in response to detection of events in the system, the events comprising addition of a dataset, deletion of a dataset, a change to the at least one stack of the system components for a dataset, and a change in the compliance score for a node of the graph; and
calculating a new stack-dependent compliance score for each dataset affected by an event of the events.

13. The computer-implemented method of claim 1, wherein the system components comprise at least a subset of: applications; services; operating systems; platforms; virtual machines; hypervisors; containers; storage systems; physical machines; network devices; networks; network clusters; datacenters, and clusters of datacenters.

14. The computer-implemented method of claim 1, further comprising:
for each of a subset of nodes corresponding to the system components:
calculating a stack-dependent compliance score for the subset of nodes as a function of the compliance score stored for the subset of nodes and the compliance scores stored for a set of nodes reached by traversing directed edges in the graph from the subset of nodes; and
generating an alert if the stack-dependent compliance score for a component traverses a predetermined risk threshold for the system component.

15. A computer program product comprising:
one or more computer readable storage media and program instructions stored on the one or more computer readable storage media, the program instructions comprising:
for each dataset in a computing system, program instructions to identify at least one stack of hierarchically-dependent system components on which a dataset is dependent;
program instructions to communicate with one or more compliance monitoring applications to obtain local compliance scores for the hierarchically-dependent system components, within the scope of a scan, wherein data for populating a system graph is obtained by placing calls to an Application Programming Interfaces (API) and represented by a node;
program instructions to generate the system graph having nodes interconnected by directed edges based on the calls to the API, wherein each dataset, and each component in the at least one stack, is represented by a corresponding node of the graph and dependency of each dataset on the at least one stack, and between successive components in each stack of the at least one stack, is represented by a directed edge between nodes of the graph;
program instructions to store the compliance scores for respective nodes corresponding to system components, the compliance score for a node relating to the corresponding system component;
for each dataset, program instructions to calculate a stack-dependent compliance score as a function of the compliance scores for a set of nodes reached by traversing directed edges in the graph from the node corresponding to the dataset; and
program instructions to generate an alert if the stack-dependent compliance score for a dataset breaches a predetermined risk threshold for the dataset.

16. The computer program product of claim 15, wherein the program instructions stored on the one or more computer readable storage media further comprise:
in response to an alert for a dataset, program instructions to initiate an action in the system to mitigate the compliance risk.

17. The computer program product of claim 15, wherein the program instructions stored on the one or more computer readable storage media further comprise:
for any edge in the system graph representing one of a predefined set of dependency types, program instructions to identify the edge as a priority edge; and
in calculating the stack-dependent compliance score for each dataset, program instructions to identify the set of nodes by traversing directed edges from the node corresponding to the dataset up to a predetermined maximum depth in the graph, subject to always traversing any priority edge between nodes corresponding components in the at least one stack for the dataset.

18. The computer program product of claim 15, wherein the program instructions stored on the one or more computer readable storage media further comprise:
program instructions to define a weight for each edge of the graph in dependence on a type of dependency represented by the edge; and
in calculating the stack-dependent compliance score for each dataset, program instructions to calculate an impact score for each node in the set as a function of the compliance score for the node and the weight of the directed edge traversed to reach the node, and to calculate the stack-dependent compliance score as a function of the impact scores for nodes in the set.

19. A computer system comprising:
one or more computer processors;
one or more computer readable storage media; and
program instructions stored on the one or more computer readable storage media for execution by at least one of the one or more computer processors, the program instructions comprising:
system analyzer logic adapted, for each dataset in the system, to identify at least one stack of hierarchically-dependent system components on which a dataset is dependent;
the system analyzer logic adapted to communicate with one or more compliance monitoring applications to obtain local compliance scores for the hierarchically-dependent system components, within the scope of a scan, wherein data for populating a system graph is obtained by placing calls to an Application Programming Interfaces (API) and represented by a node;
graph generator logic adapted to generate the system graph having nodes interconnected by directed edges based on the calls to the API, wherein each dataset, and each component in the at least one stack, is represented by a corresponding node of the graph and dependency of each dataset on the at least one stack, and between successive components in each stack of the at least one stack, is represented by a directed edge between nodes of the graph;
memory for storing the system graph and the compliance scores for respective nodes corresponding to system components, the compliance score for a node relating to the corresponding system component; and
compliance manager logic adapted, for each dataset, to calculate a stack-dependent compliance score as a function of the compliance scores for a set of nodes identified by traversing directed edges in the graph from the node corresponding to the dataset, and to generate an alert if the stack-dependent compliance score for a dataset breaches a predetermined risk threshold for the dataset.

20. The computer system of claim 19, wherein the computer system is adapted, in response to an alert for a dataset, to initiate an action in the system to mitigate the compliance risk, wherein the action comprises at least one of: restricting access permissions in the system for the dataset; deleting the dataset; isolating a system component storing the dataset; and reconfiguring the at least one stack of system components for the dataset.

* * * * *